United States Patent [19]
Zhou et al.

[11] Patent Number: 5,935,672
[45] Date of Patent: Aug. 10, 1999

[54] REVERSIBLE OPTICAL INFORMATION MEDIUM

[75] Inventors: Guo-Fu Zhou; James H. Coombs; Johan P. W. B. Duchateau, all of Eindhoven, Netherlands

[73] Assignee: U.S. Philips Corporation, New York, N.Y.

[21] Appl. No.: 08/891,340

[22] Filed: Jul. 10, 1997

[30] Foreign Application Priority Data

Mar. 17, 1997 [EP] European Pat. Off. .............. 97200796

[51] Int. Cl.$^6$ ...................................................... B32B 3/02
[52] U.S. Cl. ........................ 428/64.1; 428/64.1; 428/64.2; 428/64.4; 428/64.5; 428/64.6; 428/64.7; 428/457; 428/688; 428/913; 430/270.13; 430/495.1; 430/945; 369/275.1; 369/275.4; 369/283; 369/288
[58] Field of Search ................................... 428/64.1, 64.2, 428/64.4, 64.5, 64.6, 64.7, 457, 688, 913; 430/270.13, 495.1, 945; 369/275.1, 275.4, 283, 288

[56] References Cited

U.S. PATENT DOCUMENTS

| 5,289,453 | 2/1994 | Ohno et al. ............................ 369/100 |
| 5,474,826 | 12/1995 | Honguh et al. ........................ 428/64.6 |
| 5,581,539 | 12/1996 | Horie et al. ........................ 369/275.4 |
| 5,641,606 | 6/1997 | Suzuki et al. ....................... 430/270.13 |
| 5,652,037 | 7/1997 | Ohkawa et al. ....................... 428/64.1 |

Primary Examiner—Elizabeth Evans
Attorney, Agent, or Firm—Michael E. Belk

[57] ABSTRACT

A description is given of an reversible optical information medium comprising a substrate, a first dielectric layer, a phase-change recording layer on the basis of Ge—Sb—Te, a second dielectric layer, and a metal mirror layer. The recording layer comprises an alloy having the composition $Ge_{50x}Sb_{40-40x}Te_{60-10x}$ in atom %, wherein $$0.166 \leq x \leq 0.444$$

and wherein the layer thickness $d_3$ of said recording layer ranges between 25 and 35 nm. Such a medium is suitable for high speed recording (i.e. at least twice the CD-speed), and has a large cyclability of at least $10^5$ direct overwrite cycles.

18 Claims, 7 Drawing Sheets

REVERSIBLE OPTICAL INFORMATION MEDIUM

Co-pending application Ser. No. 08/795,819, filed Feb. 6, 1997, entitled "Reversible Optical Information Medium" by the same inventors, is hereby incorporated herein by reference.

FIELD OF THE INVENTION

The invention relates to the field of optical information media for erasable high-speed recording means of a laser-light beam.

BACKGROUND OF THE INVENTION

Optical information or data storage based on the phase change principle is attractive, because it combines the possibilities of direct overwrite (DOW) and high storage density with easy compatibility with read-only systems. Phase-change optical recording involves the formation of submicrometer-sized amorphous recording marks in a thin crystalline film using a focused laser-light beam. During recording information, the medium is moved with respect to the focused laser-light beam which is modulated in accordance with the information to be recorded. Due to this, quenching takes place in the phase-change recording layer and causes the formation of amorphous information bits in the exposed areas of the recording layer which remains crystalline in the unexposed areas. Erasure of written amorphous marks is realized by recrystallizing through heating with the same laser. The amorphous marks represent the data bits, which can be reproduced via the substrate by a low-power focused laser-light beam. Reflection differences of the amorphous marks with respect to the crystalline recording layer bring about a modulated laser-light beam which is subsequently converted by a detector into a modulated photocurrent in accordance with the coded, recorded digital information. The modulated photocurrent is a HF signal having a lowest fundamental frequency. The peak-to-peak value of the photocurrent is designated as $I_{11}$, and the peak value of the HF signal associated with said frequency is designated as $I_{peak}$. The modulation m is defined as:

$$m = I_{11}/I_{peak}$$

and is proportional to the optical contrast M, which is defined as:

$$M = (R_H - R_L)/R_H$$

wherein $R_H$ and $R_L$ are the reflections of the crystalline and amorphous material, respectively.

The main problems in phase-change optical recording are the required large number of overwrite cycles (cyclability), i.e. the number of repeated writing (amorphization) and erasing (recrystallization) operations, and a proper crystallization speed. High crystallization speed is particularly required in high-density recording and high data rate applications, such as disc-shaped DVD-RAM and optical tape, where the complete crystallization time has to be shorter than 100 ns, preferably as short as 30 to 70 ns. If the crystallization speed is not high enough to match the linear velocity of the medium relative to the laser-light beam, the old data (amorphous marks) from the previous recording can not be completely removed (recrystallized) during DOW. This will cause a high noise level.

A well-known material for phase-change recording is based on Ge—Sb—Te. However, none of the known recording media satisfies all the requirements for the phase-change optical recording, in particular as regards the demands for cyclability and crystallization speed.

An optical information medium of the type mentioned in the opening paragraph is known from U.S. Pat. No. 5,289,453. The known medium of the phase-change type comprises a disc-shaped substrate carrying a stack of layers consisting, in succession, of a first dielectric layer, a recording layer of a phase-change Ge—Sb—Te alloy, a second dielectric layer and a metal reflective layer. Such a stack of layers can be referred to as an IPIM structure, wherein M represents a reflective or mirror layer, I represents a dielectric layer and P represents a phase-change recording layer. Said patent discloses a compound $Ge_xSb_yTe_z$ for high speed recording (i.e. a relative linear speed of 8–13 m/s) which is located in an area JKLM in the triangular ternary Ge—Sb—Te composition diagram, which area has angular points J ($Ge_{22.5}Sb_{22}Te_{55.5}$); K ($Ge12.5Sb_{32}Te_{55.5}$); L ($Ge_{14.5}Sb_{37.5}Te_{48}$); M ($Ge_{26}Sb_{26}Te_{48}$). This area diverges from the tie-line connecting GeTe and $Sb_2Te_3$. According to said patent, for high speed recording the thickness of the phase-change recording layer should range from 12 to 35 nm, preferably from 12 to 25 nm. Above a thickness of 25 nm, jitter, which is a measure of the distortion of the shape of a recording mark, increases. According to said patent, jitter does not increase to twice the initial value after repeating recording $10^5$ times.

The above citations are hereby incorporated in whole by reference.

SUMMARY OF THE INVENTION

A disadvantage of the known recording medium is that the jitter increases to an unacceptable level during the first few hundred DOW-cycles. This effect will be shown hereinbelow.

It is an object of the invention to provide, inter alia, an erasable optical information medium which is suitable for high speed optical recording, such as DVD-RAM and optical tape, and which has an excellent cyclability during repeated recording and erasing operations, resulting in good DOW characteristics. High speed recording is to be understood to mean in this context a linear velocity of the medium relative to the laser-light beam of at least 2.4 m/s, which is two times the speed according to the compact disc standard. The jitter of the medium should be at a low, constant level during at least $10^5$ DOW-cycles, also during the first few hundred cycles.

These objects are achieved in accordance with the invention by an optical information medium as described in the opening paragraph, which is characterized in that the recording layer comprises an alloy of the composition defined by the formula $Ge_{50x}Sb_{40-40x}Te_{60-10x}$ (in atomic percentages), wherein $0.166 \leq x \leq 0.444$; the recording layer having a thickness of 25 to 35 nm; the second dielectric layer having a thickness of 15 to 50 nm; the metal mirror layer having a thickness of 60 to 160 nm.

This composition exists on a part of the line connecting the compounds GeTe and $Sb_2Te_3$ in the triangular Ge—Sb—Te composition diagram, which is shown in FIG. 1, and includes the stoichiometric compounds $Ge_2Sb_2Te_5$ (x=0.444), $GeSb_2Te_4$ (x=0.286) and $GeSb_4Te_7$ (x=0.166). Especially these ternary stoichiometric compounds are preferred, because these materials crystallize rapidly since no segregation is required during crystallization.

The crystallization speed of said Ge—Sb—Te alloys depends strongly on the layer thickness of the recording layer. The important parameter is the complete erase time $t_e$ (in ns), which is defined as the minimum duration of the erasure pulse for complete crystallization of a written amorphous mark in a crystalline environment, which is measured statically. The complete erase time $t_e$ decreases rapidly as the layer thickness increases up to 27 nm, and then tends to saturate at a value of about 50–60 ns upon further increase of the layer thickness. When the recording layer is thicker than 27 nm, $t_e$ is essentially independent of thickness. As from 25 nm $t_e$ falls below a value of 100 ns, which is necessary for high speed recording. From the viewpoint of $t_e$, the thickness of the recording layer should be at least 25 nm, preferably at least 27 nm.

The cyclability of the medium can be represented by the value $M_{50000}/M_0$ when 50000 cycles are demanded, which is the relative change of optical contrast after 50000 cycles and 0 cycles. In every cycle the written amorphous marks are erased by recrystallizing through heating with a laser-light beam while the new amorphous marks are written. The ideal value of $M_{50000}/M_0$ is 1.0, i.e. the optical contrast remains unchanged after cycling. For practical reasons this value should be between 0.7 and 1.3, because outside this range the recording material cannot be used anymore. The value of $M_{50000}/M_0$ was found to depend on the layer thickness of the recording layer. The value of $M_{50000}/M_0$ is larger than 0.7 when the thickness of the recording layer is 23 nm or more. The value of $M_{50000}/M_0$ is smaller than 1.3 when the thickness of the recording layer is 35 nm or less. As a result of the combined demands regarding $t_e$ and cyclability, the thickness of the recording layer should range between 25 and 35 nm, preferably between 27 and 35 nm. As will be elucidated hereinbelow, a medium having a recording layer with a thickness between 25 and 35 nm has a constant low jitter during the first $10^5$ DOW-cycles.

When the value of x of the above-defined composition becomes larger than 0.444, $t_e$ becomes unacceptably high. For example, a recording medium having the intermetallic compound $Ge_{39}Sb_9Te_{52}$ (x=0.78) as a recording layer has a $t_e$ value of at least 120 ns. Also the cyclability is poor: already after $10^4$ cycles the value $M_{10000}/M_0$ drops below 0.7. When x becomes smaller than 0.166 the crystallization temperature becomes unacceptably low, i.e. the thermal stability of the recording layer is reduced.

There is no observable influence of the thickness of the first dielectric layer, i.e. the layer between the substrate and the phase-change recording layer, on $t_e$ and the cyclability value $M_{50000}/M_0$. Thus, it is possible to vary the thickness of this layer for other, for example optical, reasons without affecting the thermal properties of the stack. This layer protects the recording layer from humidity and the substrate from thermal damage, and optimises the optical contrast M. From the viewpoint of jitter, the thickness of the first dielectric layer is prefarably at least 70 nm, as will be explained later. In view of e.g. optical contrast, the thickness of this layer is limited to 500 nm.

An optimum thickness range for the second dielectric layer, i.e. the layer between the recording layer and the metal mirror layer, is found between 15 and 50 nm, preferably between 20 and 40 nm. When this layer is too thin, the thermal insulation between the recording layer and the metal mirror layer is adversely affected. As a result, the cooling rate of the recording layer is increased, which leads to slow crystallization process and a poor cyclability. The cooling rate will be decreased by increasing the thickness of the second dielectric layer.

The time $t_e$ is not sensitive to the thickness of the metal mirror layer in the range from 20 to 200 nm. But the cyclability is adversely affected when the metal mirror layer is thinner than 60 nm, because the cooling rate is too slow. When the metal mirror layer is 160 nm or thicker, the cyclability deteriorates further, and the recording and erasing power must be high because of the increased thermal conduction. Preferably the thickness of the metal mirror layer is between 80 and 120 nm.

The first and second dielectric layers may be made of a mixture of ZnS and $SiO_2$, e.g. $(ZnS)_{80}(SiO_2)_{20}$. Alternatives are, e.g. $SiO_2$, $TiO_2$, ZnS, AlN and $Ta_2O_5$.

For the metal mirror layer, metals such as Al, Ti, Au, Ni, Cu, Ag and Cr, and alloys of these metals, can be used.

Both the reflective layers and the dielectric layers can be provided by vapour deposition or sputtering.

The substrate of the information medium is at least transparent to the laser wavelength, and is made, for example, of polycarbonate, polymethyl methacrylate (PMMA), amorphous polyolefin or glass. In a typical example, the substrate is disc-shaped and has a diameter of 120 mm and a thickness of 1.2 mm.

Alternatively, the substrate may be in the form of a synthetic resin flexible tape, made e.g. from a polyester film. In this way an optical tape will be obtained for use in an optical tape recorder, which is for example based on a fast spinning polygon. In such a device the reflected laser-light beam makes transverse scans across the tape surface.

The surface of the disc-shaped substrate on the side of the recording layer is, preferably, provided with a servotrack which can be scanned optically. This servotrack is often constituted by a spiral-shaped groove and is formed in the substrate by means of a mould during injection moulding or pressing. This groove can be alternatively formed in a replication process in a synthetic resin layer, for example, of a UV light-cured layer of acrylate, which is separately provided on the substrate. In high-density recording such a groove has a pitch e.g. of 0.7–0.8 $\mu$m and a width of 0.5 $\mu$m.

Optionally, the outermost layer of the stack is screened from the environment by means of a protective layer of, for example, UV light-cured poly(meth)acrylate.

High-density recording and erasing can be achieved by using a short-wavelength laser, e.g. with a wavelength of 675 nm or shorter (red to blue).

The phase change recording layer can be applied to the substrate by vapour depositing or sputtering of a suitable target. The layer thus deposited is amorphous and exhibits a low reflection. In order to constitute a suitable recording layer having a high reflection, this layer must first be completely crystallized, which is commonly referred to as initialization. For this purpose, the recording layer can be heated in a furnace to a temperature above the crystallization temperature of the Ge—Sb—Te alloy, e.g. 180° C. A synthetic resin substrate, such as polycarbonate, can alternatively be heated by a laser-light beam of sufficient power. This can be realized, e.g. in a recorder, in which case the laser-light beam scans the moving recording layer. The amorphous layer is then locally heated to the temperature required for crystallizing the layer, without the substrate being subjected to a disadvantageous heat load.

If desired, $t_e$ can be increased by diverging from the tie-line between GeTe and $Sb_2Te_3$ by adding up to 3 at. % Sb to the Ge—Sb—Te alloys on the claimed tie-line. By adding 3 at. % to $GeSb_2Te_4$ $t_e$ increases from 60 to 100 ns. Such an addition increases the recording sensitivity, i.e. it lowers the melting threshold power $P_m$.

If desired, an additional thin metal layer can be inserted between the substrate and the first dielectric layer, thereby forming a so called MIPIM-structure. Although the structure becomes more complicated, the additional metal layer increases the cooling rate of the recording layer as well as the optical contrast M.

Those skilled in the art will understand the invention and additional objects and advantages of the invention by studying the description of preferred embodiments below with reference to the following drawings which illustrate every feature of the appended claims.

DETAILED DESCRIPTION OF THE PREFERRED EMBODIMENT

Example

Figure 2:
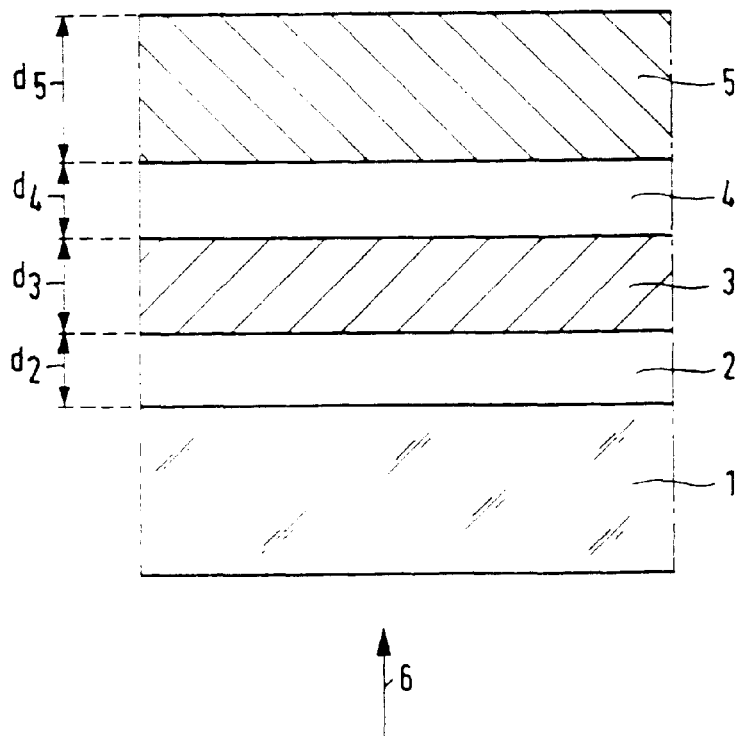
FIG. 2 shows a schematic cross-sectional view of an optical information medium in accordance with the invention.

FIG. 2 schematically shows a part of a cross-section of an optical information disc in accordance with the invention. Reference numeral 1 denotes a glass disc-shaped substrate having a diameter of 120 mm and a thickness of 1.2 mm. The substrate 1 is provided with a IPIM stack of the following structure:

dielectric layer 2 of $(ZnS)_{80}(SiO_2)_{20}$ with a thickness $d_2=20$ nm recording layer 3 of Ge—Sb—Te with a thickness $d_3$, dielectric layer 4 of $(ZnS)_{80}(SiO_2)_{20}$ with a thickness $d_4=20$ nm, metal mirror layer 5 of Al with a thickness $d_5=100$ nm.

All the layers are provided by sputtering. The initial crystalline state of the recording layer 3 is obtained by annealing the as-deposited amorphous alloy in an oven at temperatures up to 180° C.

A laser-light beam for recording, reproducing and erasing of information enters the recording layer 3 via the substrate 1. This beam is schematically represented by arrow 6. The amorphous marks are written with a single laser pulse of power $P_w=1.25 P_m$ ($P_m$=melting threshold power) and duration 100 ns. The erase power is $P_w/2$.

Figure 1:
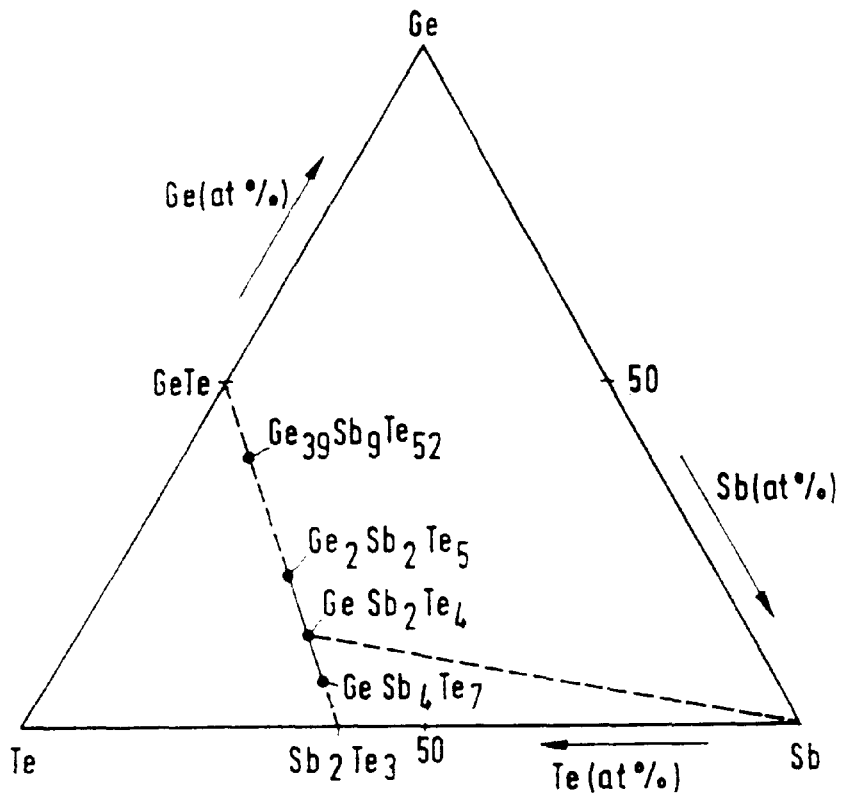
FIG. 1 shows the ternary composition diagram Ge—Sb—Te in atom %, and the line corresponding to formula $Ge_{50x}Sb_{40-40x}Te_{60-10x}$ in atomic percentages, wherein according to the invention $0.166 \leq x \leq 0.444$.
Figure 3:
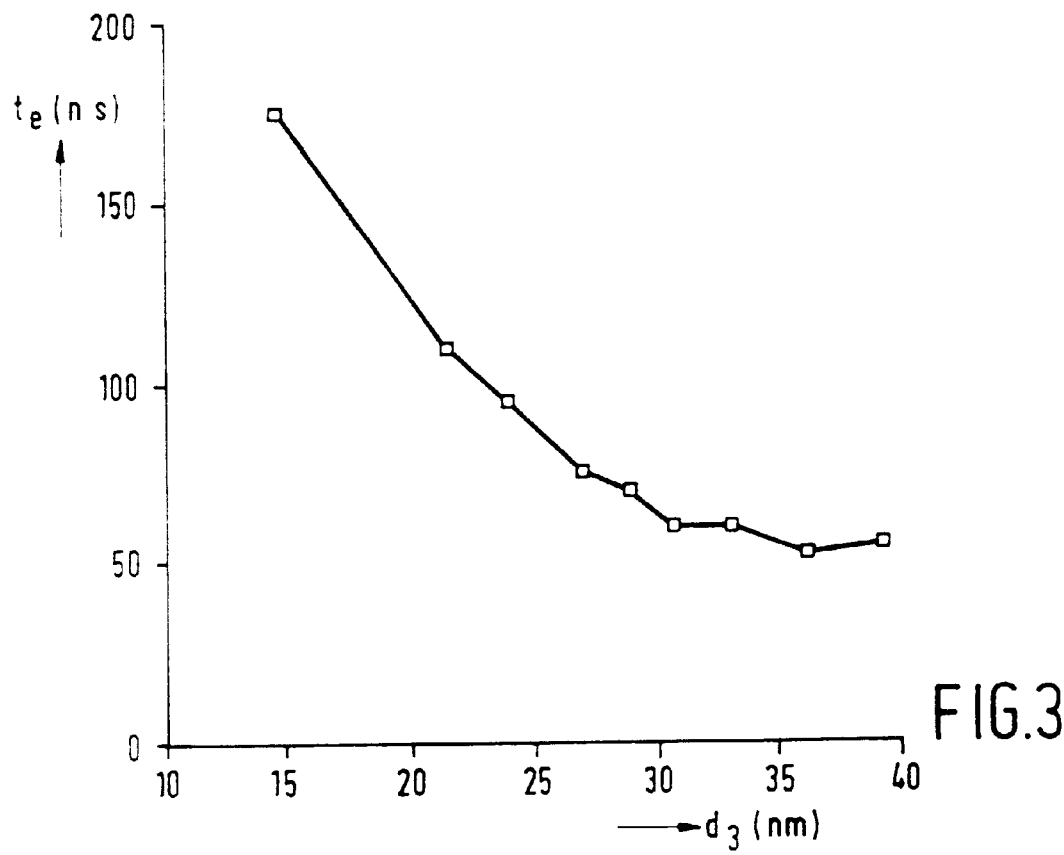
FIG. 3 shows the relation between complete erase time $t_e$ (in ns) and the thickness $d_3$ (in nm) of the recording layer for the $GeSb_2Te_4$ material of the invention.

The dependence of $t_e$ in ns (i.e. time when crystallization of a written amorphous mark is completed) on the thickness $d_3$ in nm of the phase-change layer for the compound $GeSb_2Te_4$, see FIG. 1 (with x=0.286 giving the atomic percentages $Ge_{14.3}Sb_{28.6}Te_{57.1}$) is shown in FIG. 3. From this FIG. 3 it is clear that $t_e$ decreases rapidly by increasing $d_3$ up to about 27 nm, and it tends to saturate at a low value of about 60 ns upon further increase of $d_3$.

Figure 4:
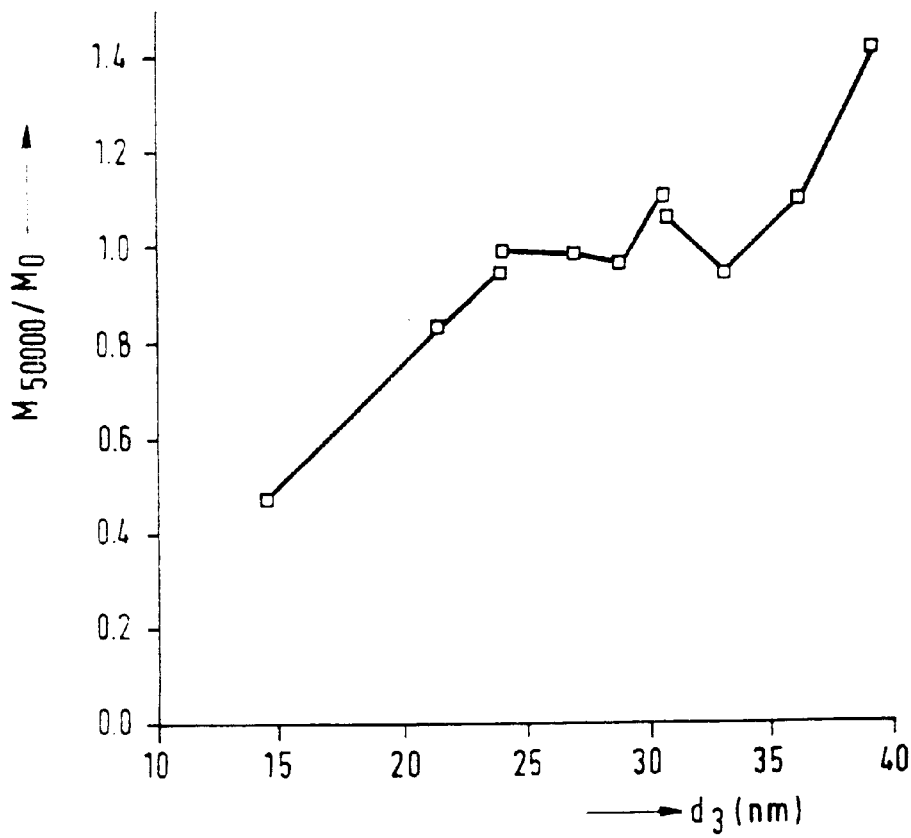
FIG. 4 shows the relation between the relative change of optical contrast after 50000 cycles and 0 cycles ($M_{50000}/M_0$) and the thickness $d_3$ (in nm) of the recording layer for $GeSb_2Te_4$ material of the invention.

The $d_3$-dependence of the relative change of optical contrast after 50000 cycles and 0 cycles ($M_{50000}/M_0$) is displayed in FIG. 4. When $d_3$ is between 25 and 35 nm $M_{50000}/M_0$ is $1.0\pm0.1$, i.e. the optical contrast remains practically unchanged.

The combination of FIGS. 3 and 4 shows that when $d_3$ is between 25 and 35, a high crystallization speed is obtained, which is essential for high-speed optical recording and a good cyclability of at least 50000 cycles.

Example 2

Figure 5:
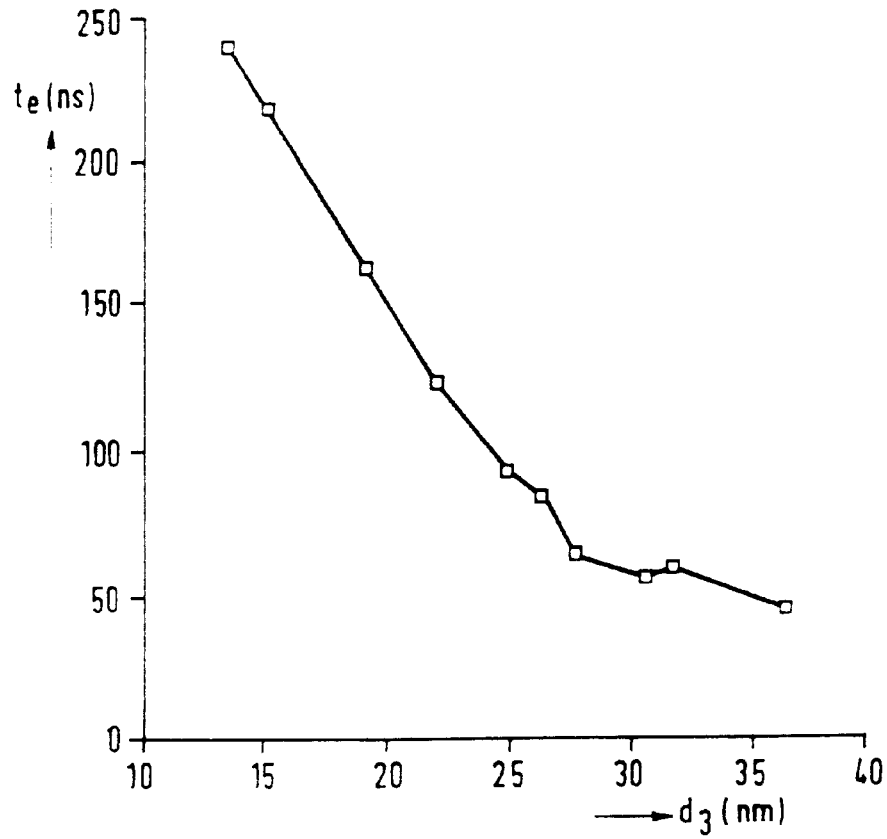
FIG. 5 shows the relation between complete erase time $t_e$ (in ns) and the thickness $d_3$ (in nm) of the recording layer for the $Ge_2Sb_2Te_5$ material of the invention.

Exemplary embodiment 1 is repeated, using a recording layer 3 having the composition $Ge_2Sb_2Te_5$, see FIG. 1 (with x=0.444 giving the atomic percentages $Ge_{22.2}Sb_{22.2}Te_{55.6}$). FIG. 5 shows the dependence of $t_e$ on the thickness $d_3$ of the recording layer. From this FIG. 5 it is clear that $t_e$ falls below 100 ns when the thickness $d_3=25$ nm, and decreases further by increasing $d_3$ up to about 27 nm. $t_e$ tends to saturate at a low value of about 50 ns upon further increase of $d_3$.

Figure 6:
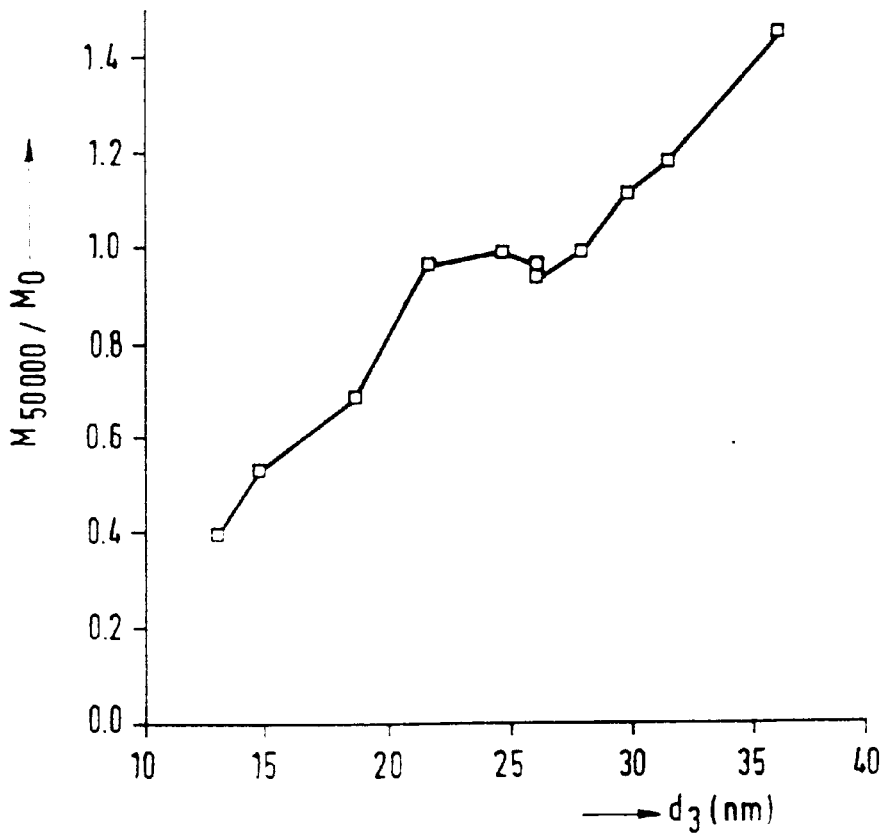
FIG. 6 shows the relation between the relative change of optical contrast after 50000 cycles and 0 cycle ($M_{50000}/M_0$) and the thickness $d_3$ (in nm) of the recording layer for the $Ge_2Sb_2Te_5$ material of the invention.

The $d_3$ dependence of the relative change of optical contrast after 50000 cycles and 0 cycles ($M_{50000}/M_0$) is displayed in FIG. 6. When $d_3$ is between 20 and 35 nm, $M_{50000}/M_0$ is $1.0\pm0.3$, in which range the recording medium can be used in practice.

The combination of FIGS. 5 and 6 shows that when $d_3$ is between 25 and 35, a high crystallization speed is obtained, which is essential for high speed optical recording and for a good cyclability of at least 50000 cycles.

Example 3

Figure 7:
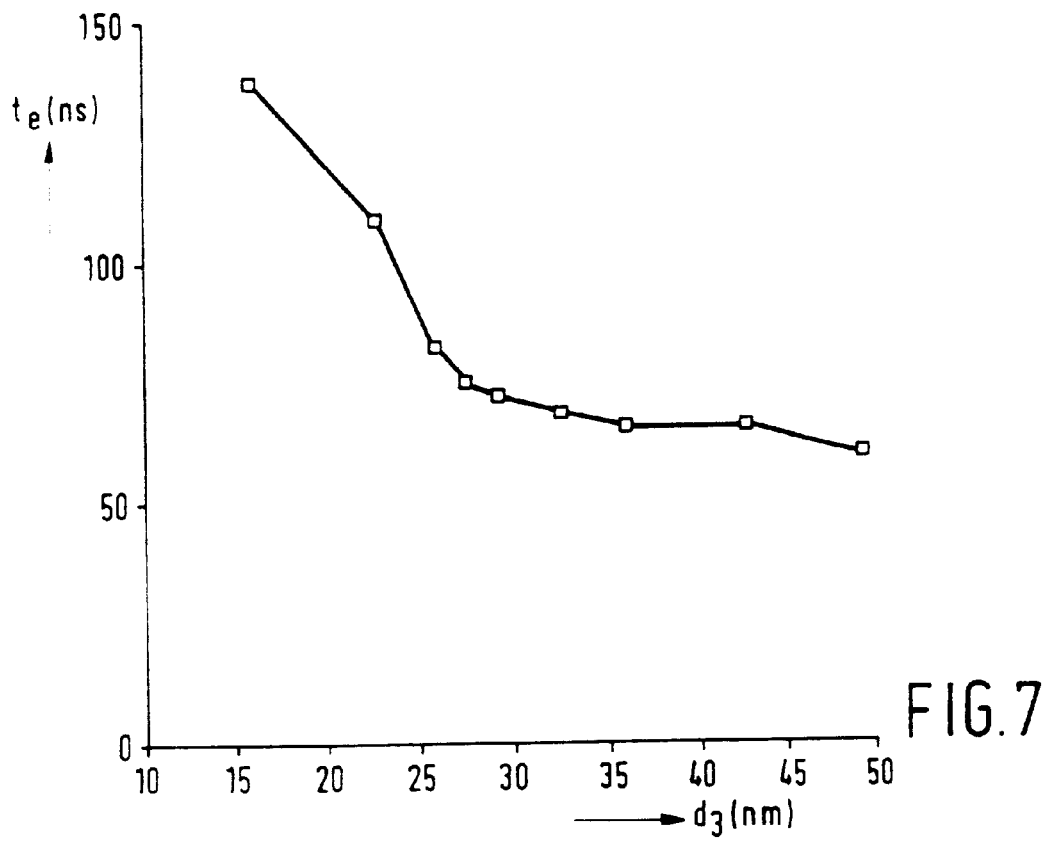
FIG. 7 shows the relation between complete erase time $t_e$ (in ns) and the thickness $d_3$ (in nm) of the recording layer for the $GeSb_4Te_7$ material of the invention.

Exemplary embodiment 1 is repeated, using a recording layer 3 having the composition $GeSb_4Te_7$, see FIG. 1 (with x=0.166 giving the atomic percentages $Ge_{8.3}Sb_{33.3}Te_{58.4}$). FIG. 7 shows the dependence of $t_e$ on the thickness $d_3$ of the recording layer. From this FIG. 7 it is clear that $t_e$ falls below 100 ns when the thickness $d_3=24$ nm, and decreases further by increasing $d_3$ up to about 27 nm. $t_e$ tends to saturate at a low value of about 70 ns upon further increase of $d_3$.

Figure 8:
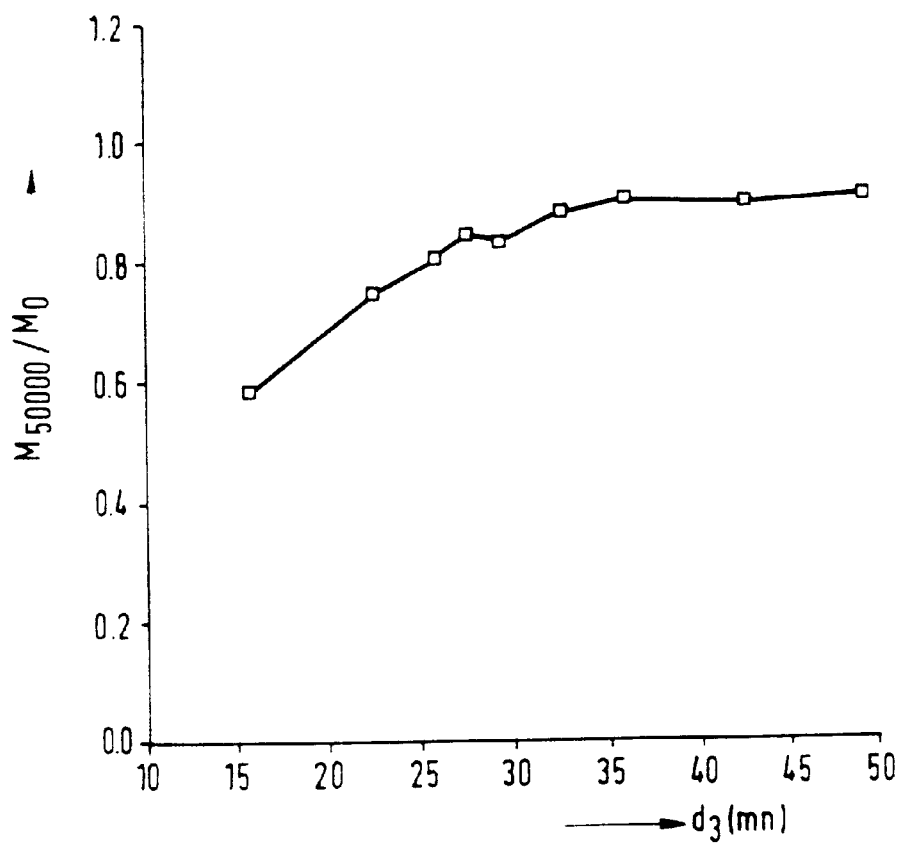
FIG. 8 shows the relation between the relative change of optical contrast after 50000 cycles and 0 cycle ($M_{50000}/M_0$) and the thickness $d_3$ (in nm) of the recording layer for $GeSb_4Te_7$ material of the invention.

The $d_3$ dependence of the relative change of optical contrast after 50000 cycles and 0 cycles ($M_{50000}/M_0$) is displayed in FIG. 8. When $d_3$ is larger than 25 nm $M_{50000}/M_0$ is larger than 0.8. However, the optical contrast M between crystalline and amorphous becomes unacceptably low when the recording layer is thicker than 35 nm. From this viewpoint, the recording layer thickness $d_3$ should not exceed 35 nm.

Comparative Example (Not According to the Invention)

Figure 9:
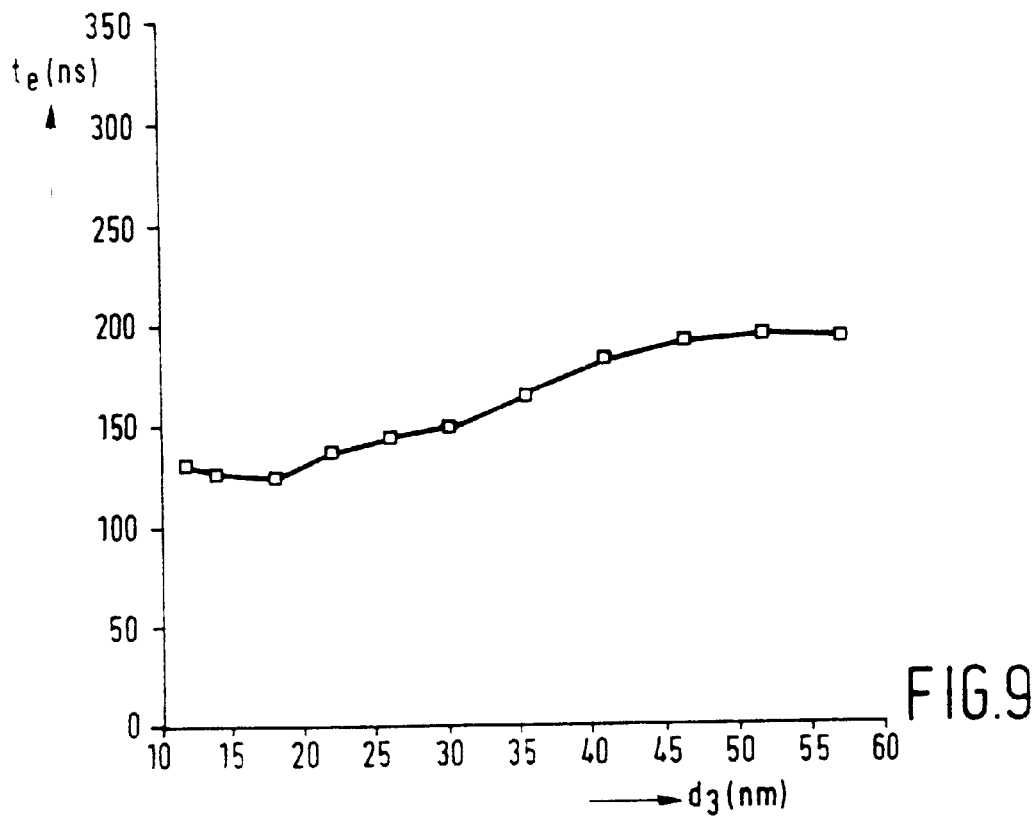
FIG. 9 shows the relation between complete erase time $t_e$ (in ns) and the thickness $d_3$ (in nm) of the recording layer for $Ge_{39}Sb_9Te_{52}$ material not according to the invention.
Figure 10:
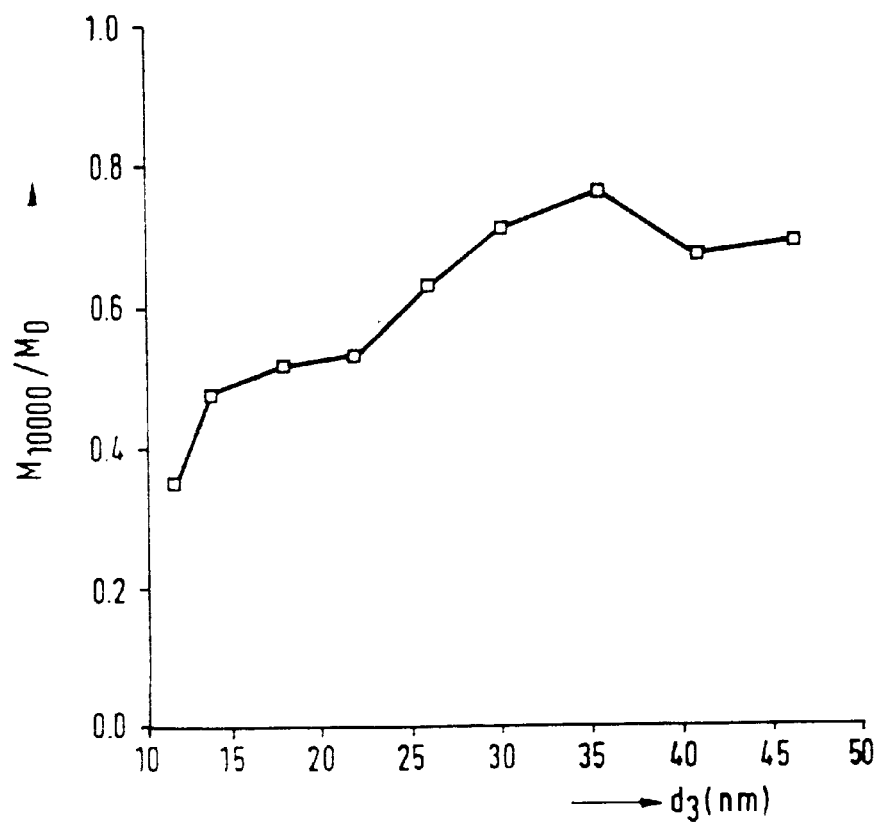
FIG. 10 shows the relation between the relative change of optical contrast after 10000 cycles and 0 cycle ($M_{10000}/M_0$) and the thickness $d_3$ (in nm) of the recording layer for $Ge_{39}Sb_9Te_{52}$ material not according to the invention.

Exemplary embodiment 1 is repeated, using a recording layer 3 having the atomic composition $Ge_{39}Sb_9Te_{52}$, see FIG. 1 (with x=0.78), which is on the tie-line connecting GeTe—$Sb_2Te_3$, but which is outside the claimed range. FIG. 9 shows the dependence of $t_e$ on the thickness $d_3$ of the recording layer. The complete erasure time $t_e$ increases as the thickness $d_3$ of the recording layer increases, and it tends to become constant at a high level for values of $d_3 \geq 45$ nm. There is no value of $d_3$ at which, $t_e$ is below 100 ns, which is necessary for high-speed recording. Also the cyclability is poor. The best thickness range is between 25 and 47 nm, where after only 10000 cycles $M_{10000}/M_0$ is 0.7±0.1 (see FIG. 10). This indicates that the recording material is degraded after such a relatively limited number of cycles.

Examples 4 to 9

In these embodiments the influence of the thickness $d_4$ (in nm) of the second dielectric layer 4 on the complete erasure time $t_e$ and cyclability $M_{50000}/M_0$ is investigated. The results are summarized in Table 1. In the experiments the thicknesses of the other layers $d_2$, $d_3$ and $d_5$ of the IPIM-stack have been kept constant. For the layers 2, 4 and 5 the same materials are used as in embodiment 1. For the recording layer 3 the compound $GeSb_2Te_4$ is used.

TABLE 1

| Example | $d_2$ (nm) | $d_3$ (nm) | $d_4$ (nm) | $d_5$ (nm) | $t_e$ (ns) | $M_{50000}/M_0$ |
|---|---|---|---|---|---|---|
| 4 | 20 | 30 | 10 | 100 | 118 | 0.77 |
| 5 | 20 | 30 | 15 | 100 | 90 | 0.94 |
| 6 | 20 | 30 | 20 | 100 | 64 | 1.00 |
| 7 | 20 | 30 | 30 | 100 | 67 | 1.05 |
| 8 | 20 | 30 | 40 | 100 | 70 | 1.05 |
| 9 | 20 | 30 | 50 | 100 | 64 | 0.97 |

Table 1 shows that both $t_e$ and $M_{50000}/M_0$ are optimal when $d_4$ is 15 nm or thicker. Since the cooling rate of the recording layer 3 will decrease as the thickness d4 of the second dielectric layer increases, it is preferred to limit the thickness $d_4$ to 50 nm or less. Therefore, the best thickness range for the second dielectric layer 4 is between 15 and 50 nm, preferably between 20 and 40 nm.

Examples 10 to 15

In these embodiments the influence of the thickness $d_2$ (in nm) of the first dielectric layer 2 on the complete erasure time $t_e$ and cyclability $M_{50000}/M_0$ is investigated. The results are summarized in Table 2. In the experiments the thicknesses of the other layers $d_3$, $d_4$ and $d_5$ of the IPIM-stack have been kept constant. For the layers 2, 4 and 5 the same materials are used as in embodiment 1. For the recording layer 3 the compound $GeSb_2Te_4$ is used.

TABLE 2

| Example | $d_2$ (nm) | $d_3$ (nm) | $d_4$ (nm) | $d_5$ (nm) | $t_e$ (ns) | $M_{50000}/M_0$ |
|---|---|---|---|---|---|---|
| 10 | 10 | 30 | 20 | 100 | 69 | 0.90 |
| 11 | 30 | 30 | 20 | 100 | 72 | 1.05 |
| 12 | 50 | 30 | 20 | 100 | 64 | 1.01 |
| 13 | 70 | 30 | 20 | 100 | 70 | 1.04 |
| 14 | 90 | 30 | 20 | 100 | 70 | 1.00 |
| 15 | 120 | 30 | 20 | 100 | 67 | 1.01 |

Table 2 shows that no observable influence of the thickness $d_2$ of the first dielectric layer 2 on crystallization speed $t_e$ and cyclability $M_{50000}/M_0$ is found. However, this dielectric layer 2 protects the recording layer 3 from humidity and the substrate 1 from thermal damage, and optimises the optical contrast M. Thus, it is possible to vary the thickness $d_2$ for other reasons, e.g. optical reasons, without affecting the thermal properties of the IPIM-stack. For other reasons, namely jitter, $d_2$ is preferably at least 70 nm, as will be illustrated in Example 27.

Examples 16 to 24

In these embodiments the influence of the thickness $d_5$ (in nm) of the metal mirror layer 5 on the complete erasure time $t_e$ and cyclability $M_{50000}/M_0$ is investigated. The results are summarized in Table 3. In the experiments the thicknesses of the other layers $d_2$, $d_3$ and $d_4$ of the IPIM-stack have been kept constant. For the layers 2, 4 and 5 the same materials are used as in embodiment 1. For the recording layer 3 the compound $GeSb_2Te_4$ is used.

TABLE 3

| Example | $d_2$ (nm) | $d_3$ (nm) | $d_4$ (nm) | $d_5$ (nm) | $t_e$ (ns) | $M_{50000}/M_0$ |
|---|---|---|---|---|---|---|
| 16 | 20 | 30 | 20 | 20 | 58 | 1.37 |
| 16 | 20 | 30 | 20 | 20 | 58 | 1.39 |
| 17 | 20 | 30 | 20 | 40 | 69 | 0.82 |
| 18 | 20 | 30 | 20 | 60 | 69 | 0.88 |
| 19 | 20 | 30 | 20 | 80 | 69 | 1.00 |
| 20 | 20 | 30 | 20 | 100 | 65 | 1.02 |
| 21 | 20 | 36 | 20 | 120 | 64 | 1.01 |
| 22 | 20 | 30 | 20 | 140 | 73 | 0.95 |
| 23 | 20 | 30 | 20 | 160 | 69 | 0.99 |
| 24 | 20 | 30 | 20 | 200 | 64 | 0.73 |

Table 3 shows that the complete erasure time $t_e$ seems insensitive to the metal mirror layer thickness $d_5$ from 20 to 200 nm. But the cyclability becomes worse when the metal layer 5 is thinner than 60 nm. When the metal mirror layer 5 is thicker than 160 nm, the cyclability becomes worse again, and the writing and erasing power of the laser-light beam must be high because of the increased thermal conduction. Therefore, the thickness range of the metal mirror layer 5 should be between 60 and 160 nm, preferably between 80 and 120 nm.

Example 25

Figure 11:
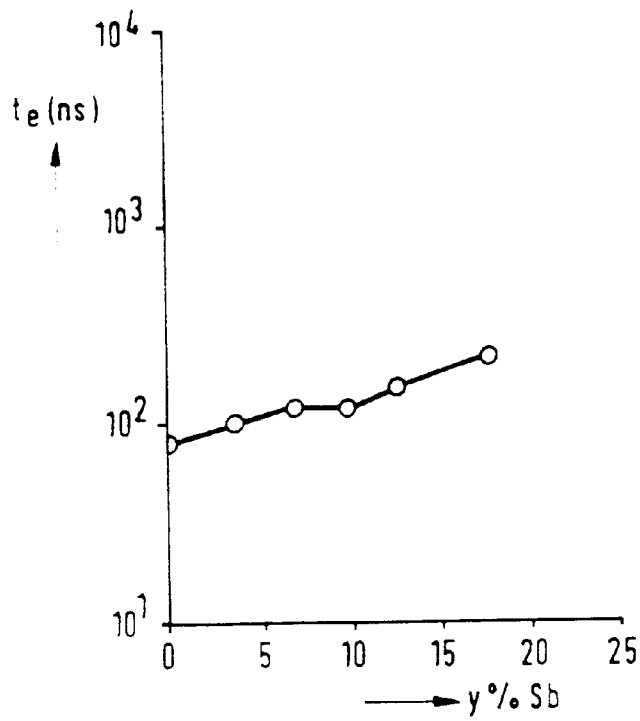
FIG. 11 shows the relation between complete erase time $t_e$ (in ns) and the addition of extra Sb (y at. %) to the compound $GeSb_2Te_4$ in the recording layer.

In an optical information medium according to exemplary embodiment 1, a recording layer 3 is used having a thickness $d_3$ of 25 nm. To the compound $GeSb_2Te_4$ in the recording layer, an additional quantity of Sb is added. FIG. 11 shows that the complete erase time $t_e$ is increased when the additional Sb-content y (atom %) is increased. The complete erase time $t_e$ is 80 ns when no additional Sb is added (y=0), while addition of 3 at % Sb (y=3) to the compound $GeSb_2Te_4$ causes an increase of $t_e$ to 100 ns. When adding extra Sb to said compound, the tie-line connecting $GeSb_2Te_4$ and Sb in the ternary composition diagram (FIG. 1) is followed. From this experiment it follows that the composition of the Ge—Sb—Te compound of the recording layer preferably should not deviate from the tie-line connecting GeTe and $Sb_2Te_3$. At most an extra 3 at. % Sb can be added to the compound.

Example 26

In this experiment the jitter has been judged. The EFM modulation code (CD code) is used to generate random data. The jitter J, which is the standard deviation of the difference between the edges of a recorded mark and the position corresponding to the recovered data clock time, is a standard parameter used for judging the cyclability of a disc. The jitter has to be below 12% of the clock time $T_c$, i.e. 30 ns at CD speed (1.2 m/s; clock time 230 ns). The life of an optical disc is thus the time when the jitter J reaches 12% of the clock time $T_c$. Both the leading and trailing edges of the marks are measured.

Two recording discs A and B are prepared according to table 4, using the materials for the layers according to exemplary embodiment 1. Both discs are provided on one side of the substrate with a spiral-shaped servotrack in the form of a groove, and are initialized in the recorder. The groove is provided in a UV-light cured layer of acrylate by means of a replication process. These two discs are designed in such a way that the thickness $d_3$ of the recording layer is different, but the thermal and optical properties are almost the same by tuning the thickness $d_2$ of the first dielectric layer 2, i.e. the layer between the substrate 1 and the recording layer 3.

TABLE 4

|  | disc A not according to invention | disc B according to invention |
|---|---|---|
| $d_2$ of dielectric layer 2 (nm) | 150 | 120 |
| $d_3$ of recording layer 3 (nm) | 23 | 27 |
| $d_4$ of dielectric layer 4 (nm) | 26 | 26 |
| $d_5$ of metal mirror layer 5 (nm) | 100 | 100 |
| complete erase time $t_e$ (ns) | 83 | 67 |

Disc A is not according to the invention, because the thickness $d_3$ of the recording layer is outside the claimed range.

Figure 12:
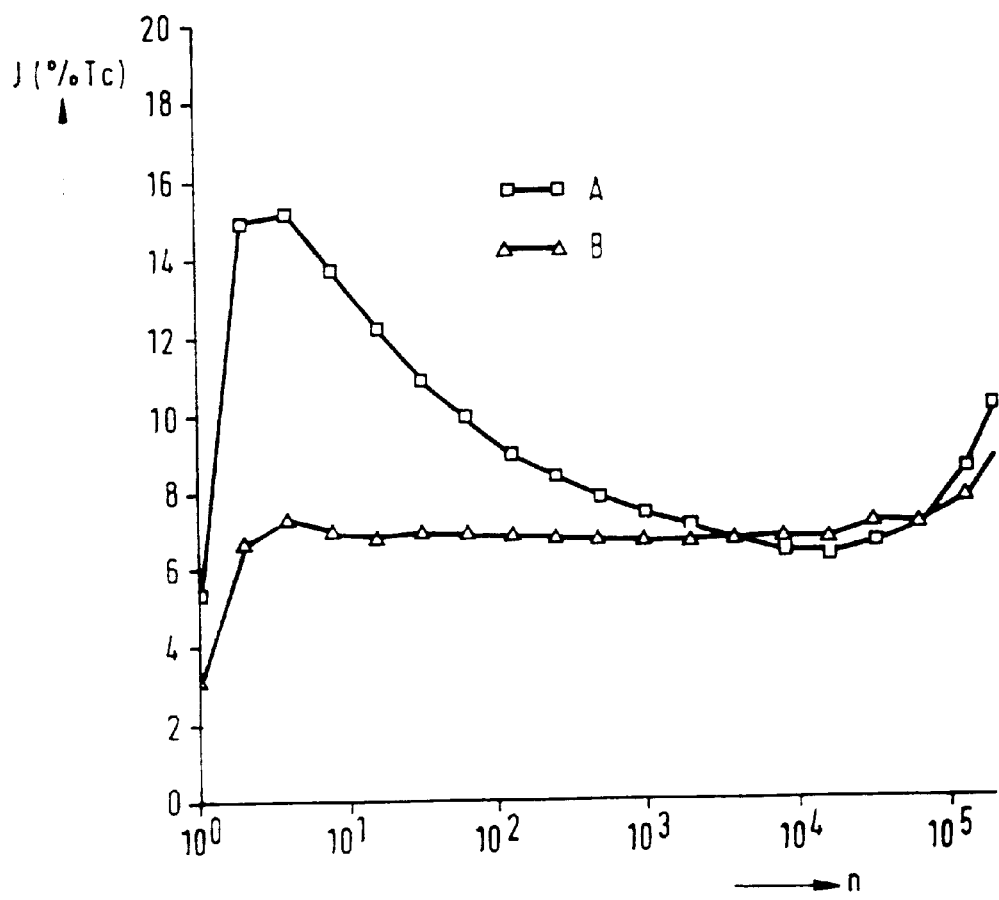
FIG. 12 shows the jitter J (in % of the clock time $T_c$) as a function of the number n of DOW-cycles at a linear disc speed of 7.2 m/s for a disc-shaped information medium A not according to the invention, and a medium B according to the invention.

In FIG. 12 the jitter J (in % of $T_c$) as a function of the number n of DOW-cycles at a linear disc speed of 7.2 m/s (six times CD-speed) is shown for both discs. During a DOW experiment, the new amorphous marks are written and simultaneously the areas between the new amorphous marks are recrystallized during the same laser spot passage. From FIG. 12 it is clear that a large jitter bump for disc A is observed in the first 1000 DOW-cycles. The peak value of J is above 12% after 4 DOW-cycles. This means that the disc cannot be used anymore after 2 times DOW. This large jitter bump is mainly attributed to the large trailing jitter, i.e. rear side of an effect. This is caused by the rest data, i.e. the amorphous trace remaining from the previous recording. This means that the amorphous marks from the previous recording are not completely crystallized during DOW. After 1000 DOW-cycles the jitter approaches the value of the first cycle. In disc B, having a thickness $d_3$ within the claimed range, such a jitter bump does not occur. The jitter J has a low, constant value, and the total number of DOW-cycles is above $2 \times 10^5$ before the upper jitter limit of 12% is reached.

Example 27

Figure 13:
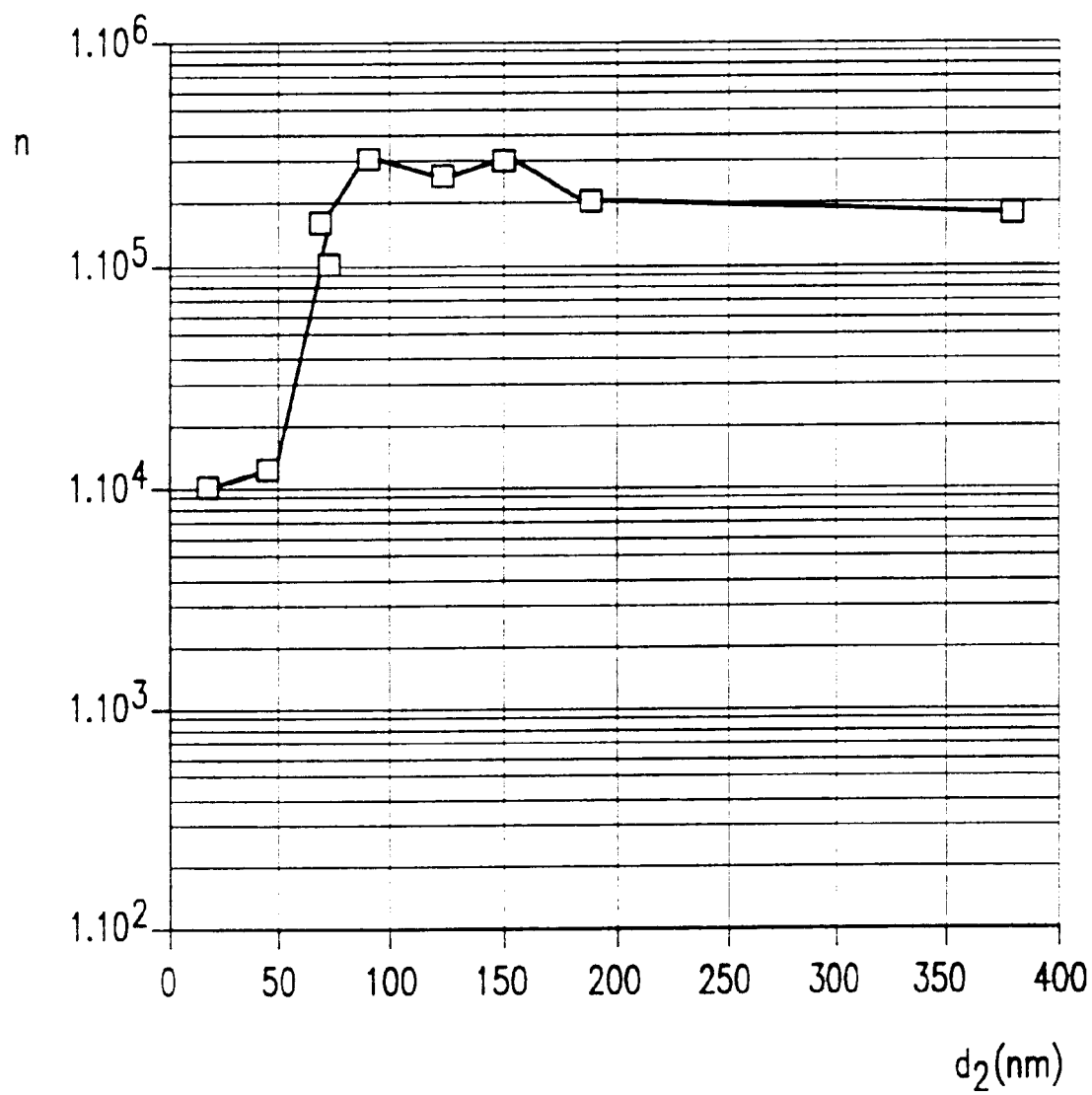
FIG. 13 shows the maximum number of cycles n as a function of the thickness $d_2$ (in nm) of the first dielectric layer, when the average jitter reaches 12% of the clock time.

In this experiment the influence of the thickness $d_2$ (in nm) of the first dielectric layer 2 on jitter is investigated. The materials of the layers, and the thicknesses of the layers other than layer 2 are the same as in Examples 10 to 15. The results from recording experiments in a recorder with wavelength of 780 nm are presented in FIG. 13. This Figure shows the maximum number of DOW cycles n as a function of $d_2$. The value of n is defined as the overwrite number when the average jitter [(leading jitter+trailing jitter)/2] reaches 12% of the clock time $T_c$. It is seen that the maximum number of cycles n increases with increasing $d_2$, and it reaches a value of above $10^5$ when $d_2$ is 70 nm or thicker.

In Examples 10 to 15 it has been demonstrated that $t_e$ and $M_{50000}/M_0$ are not sensitive to $d_2$. But the cyclability is surprisingly well-sensitive to $d_2$ when $d_2$ is smaller than 70 nm, if jitter is used as the measure of lifetime.

According to the invention an erasable optical information medium is provided, which is suitable for direct overwrite and high-speed recording, such as DVD-RAM and optical tape, with a cyclability of at least $2 \times 10^5$ DOW-cycles at a linear velocity of 7.2 m/s.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. An optical information medium for erasable high-speed recording by means of a laser-light beam, said medium comprising:
    a substrate and;
    a stack of layers on the substrate; which stack includes:
        a first dielectric layer;
        a recording layer of a phase-change material including an alloy of Ge, Sb and Te;
        a second dielectric layer; and
        a metal mirror layer; and wherein:
        the alloy has a composition defined by the formula $Ge_{50x}Sb_{40-40x}Te_{60-10x}$ in atomic percentage, where $0.166 \leq x \leq 0.444$ and additional Sb to increase the recording sensitivity;
        the recording layer has a thickness of 25 to 35 nm;
        the second dielectric layer has a thickness of 15 to 50 nm; and
        the metal mirror layer has a thickness of 60 to 160 nm.

2. The optical information medium as claimed in claim 1, wherein the recording layer has a thickness of 27 to 35 nm.

3. The optical information medium as claimed in claim 1, wherein the second dielectric layer has a thickness of 20 to 40 nm.

4. The optical information medium as claimed in claim 1, wherein the first dielectric layer has a thickness of 70 to 500 nm.

5. The optical information medium as claimed in claim 1, wherein the metal mirror layer has a thickness of 80 to 120 nm.

6. The optical information medium as claimed in claim 1, wherein the alloy comprises a stoichiometric compound selected from a group consisting of Ge Sb Te, $GeSb_2Te_4$ and $GeSb_4Te_7$.

7. The optical information medium as claimed in claim 1, wherein the metal mirror layer comprises at least one of the metals selected from a group consisting of Al, Ti, Au, Ni and Cr.

8. The optical information medium as claimed in claim 1, wherein the substrate is a disc or a tape.

9. The medium of claim 1 in which $0.7 \leq M_{5000}/M_0 \leq 1.3$ where $M_0$ is the initial optical contrast and $M_{5000}$ is the optical contrast after 5,000 rewrite cycles.

10. The medium of claim 1 in which the recording layer is crystalline for recording amorphous marks.

11. The medium of claim 1 in which the atomic percentage of the additional Sb is up to approximately 3%.

12. The medium of claim 1 in which the recording layer has a complete erase time ($t_e$) between 60 and 100 ns.

13. A process for producing an optical information medium for erasable high-speed recording, comprising the steps of:

forming a substrate; and forming a stack of layers on the substrate, including the steps of:

forming a first dielectric layer;

forming a recording layer of phase-change material comprising an alloy including $Ge_{50x}Sb_{40-40x}Te_{60-10x}$ in atomic percentage, where $0.166 \leq x \leq 0.444$ and additional Sb to increase the recording sensitivity and which has a thickness of 25–35 nm;

forming a second dielectric layer of 15 to 50 nm thickness; and forming a metal mirror layer 60 nm to 160 nm thick.

14. The process of claim 13, further comprising the step of moving the medium relative to a laser light beam at a relative velocity of at least approximately 2.4 m/s.

15. The process of claim 13 in which the recording layer is produced so that the recording layer is crystalline for recording amorous marks.

16. The process of claim 15, further comprising the step of producing amorphous marks in the recording layer to provide information.

17. The process of claim 13 in which the atomic percentage of the additional Sb is up to approximately 3%.

18. The process of claim 1 in which the recording layer has a complete erase time ($t_e$) between 60 and 100 ns.

* * * * *